United States Patent
Son et al.

(10) Patent No.: US 12,546,614 B2
(45) Date of Patent: Feb. 10, 2026

(54) APPARATUS FOR AND METHOD OF SEARCHING FOR AN OPTIMAL ROUTE FOR VEHICLES

(71) Applicant: HYUNDAI AUTOEVER CORP., Seoul (KR)

(72) Inventors: SangKyu Son, Seoul (KR); Ruda Rhee, Seoul (KR); AhYoung Kang, Seoul (KR); HyunSang Yoo, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 111 days.

(21) Appl. No.: 18/543,695

(22) Filed: Dec. 18, 2023

(65) Prior Publication Data
US 2024/0210187 A1    Jun. 27, 2024

(30) Foreign Application Priority Data
Dec. 23, 2022    (KR) .................. 10-2022-0182566

(51) Int. Cl.
 *G01C 21/34*    (2006.01)
 *G01C 21/00*    (2006.01)

(52) U.S. Cl.
 CPC ..... *G01C 21/3461* (2013.01); *G01C 21/3492* (2013.01); *G01C 21/3889* (2020.08)

(58) Field of Classification Search
None
See application file for complete search history.

(56) References Cited

U.S. PATENT DOCUMENTS

| | | | |
|---|---|---|---|
| 2006/0287818 A1* | 12/2006 | Okude | G08G 1/096822 |
| | | | 701/423 |
| 2018/0218602 A1* | 8/2018 | Okuyama | G08G 1/096827 |
| 2019/0277652 A1* | 9/2019 | Colasanti | G01C 21/3484 |
| 2020/0066151 A1* | 2/2020 | Morales Bolaños | ............... |
| | | | G08G 1/0129 |
| 2020/0130827 A1* | 4/2020 | Kozak | E01F 9/576 |
| 2022/0011128 A1* | 1/2022 | Lee | G01C 21/36 |
| 2022/0018674 A1* | 1/2022 | Xu | G06Q 10/08355 |
| 2023/0154327 A1* | 5/2023 | Huang | G08G 1/0133 |
| | | | 701/423 |
| 2024/0191999 A1* | 6/2024 | Xu | G08G 1/0133 |

FOREIGN PATENT DOCUMENTS

KR    20120041957 A    5/2012

* cited by examiner

*Primary Examiner* — Amelia Vorce
(74) *Attorney, Agent, or Firm* — Lempia Summerfield Katz LLC

(57) ABSTRACT

An apparatus for searching for an optimal route based on a well-used road includes a GPS module configured to detect a current vehicular position. The apparatus also includes a storage module configured to store digital map data. The apparatus also includes a processor configured to select an extension link, which is to be extended according to priority, from among a plurality of search links starting from a departure link, in order to search for an optimal route based on a route search engine on the basis of the current vehicular position and the digital map data. The processor is also configured to work out an ETA cost for the extension link for a search route through an estimated-time-of-arrival (ETA) prediction model based on a well-used road to search for the optimal route.

14 Claims, 7 Drawing Sheets

| Link ID | TRANFFIC AMOUNT PER DAY |
|---|---|
| 3807904 | 172,214 |
| 2118722 | 165,059 |
| 5943526 | 163,749 |
| 922243 | 158,186 |
| ... | ... |

| Link ID | NUMBER OF PASSING - THROUGH Odid'S |
|---|---|
| 2154421 | 1,751 |
| 5431234 | 2,006 |
| 364589 | 1,750 |
| 545212 | 2,403 |
| ... | ... |

APPARATUS FOR AND METHOD OF SEARCHING FOR AN OPTIMAL ROUTE FOR VEHICLES

CROSS-REFERENCE TO RELATED APPLICATION

This application claims priority to and the benefit of Korean Patent Application No. 10-2022-0182566, filed on Dec. 23, 2022, the entire contents of which are incorporated herein by reference.

TECHNICAL FIELD

The present disclosure relates to an apparatus and a method for searching for an optimal route based on a well-used road. More particularly, the present disclosure relates to an apparatus and a method for searching for an optimal route based on a well-used road and computing a more precise optimal route by increasing the precision in computing a cost for a route based on a well-used road.

BACKGROUND

The statements in this section merely provide background information related to the present disclosure and may not constitute prior art.

In recent years, most vehicles have been equipped with their respective navigation devices. In addition, with an increase in the number of vehicles, congestion of the vehicles frequently occurs on a road, a crossroad, and the like. For this reason, usually, when a vehicle travels on a road with which a user is familiar, the user pre-searches for a route through a navigation device and is guided to pre-recognize and avoid the road, the crossroad, and the like on which the congestion occurs.

In addition, when searching for a route, the user frequently uses estimated-time-of-arrival (ETA) information. For example, a departure time or an appointment time is determined based on the ETA information. Therefore, the more imprecise the ETA is, the more time the user spends when determining a departure time or an appointment time. The more precise the ETA is, the less time the user spends. Consequently, the user can reduce waiting time.

However, in the related art, a cost is worked out (computed), and thus a route is searched for without distinguishing between a well-used road (or popular road) and a typical road. For this reason, a problem arises in that an error occurs in searching for an optimal route.

For example, because it takes less time to pass through the well-used road (or popular road), a plurality of vehicles may use the well-used road (or popular road). On the other hand, because a plurality of vehicles uses the well-used road (or popular road), it may take more time to pass through the well-used road (or popular road). In other words, the well-used road (or popular road) may decrease or increase in cost, depending on a situation.

Therefore, a current situation requires a method of computing a more precise optimal route by increasing the precision in working out a time cost for passing through a link for the well-used road (or popular road) through a deep learning model (by decreasing or increasing a cost for the well-used road according to a situation).

SUMMARY

Various embodiments, which are made to address the above-mentioned issue, are directed to an apparatus and a method for searching for an optimal route based on a well-used road. The apparatus and the method may compute a more precise optimal route by increasing the precision in working out (computing or determining) a cost for a route based on a well-used road.

In an embodiment, according to an aspect of the present disclosure, an apparatus for searching for an optimal route based on a well-used road includes a GPS module configured to detect a current vehicular position. The apparatus also includes a storage module configured to store digital map data. The apparatus also includes a processor configured to select an extension link, which is to be extended according to priority, from among a plurality of search links starting from a departure link, in order to search for an optimal route based on a route search engine on the basis of the current vehicular position and the digital map data. The processor is also configured to work out an estimated-time-of-arrival (ETA) cost for the extension link for a search route through an ETA prediction model based on a well-used road to search for the optimal route.

In an embodiment, in the apparatus, the extension link may refer to a search link to be searched next time for according to the priority stored in a priority queue (PQ).

In an embodiment, in the apparatus, when determining an ETA cost for the extension link for the search route, the processor may determine the ETA cost by adding a cost from a current link to a destination to a cost from a departure to the current link.

In an embodiment, in the apparatus, when the well-used road is matched to the extension link by utilizing the ETA prediction model, the processor may modify and reflect a cost for the well-used road by utilizing the ETA prediction model that is based on the well-used road.

In an embodiment, in the apparatus, the processor may reflect the modified cost in the well-used road and thus may insert the extension link, which undergoes cost calculation, the priority queue (PQ).

In an embodiment, in the apparatus, in order to select the well-used road, the processor may analyze a traffic distribution by utilizing probe data. The processor may also select links representing a high traffic level (N %). The processor may also select a core link that is a link representing a high level (K %) of passing-through by Odid's, from among the links representing the high traffic level (N %). The processor may also select the well-used road passing through the selected core link.

In an embodiment, in the apparatus, in order to select the well-used road passing through the selected core link, the processor may extract all origin-destinations (OD's) passing through the core link. The processor may also extract a link through which even one of all OD's pass. The processor may also generate a table showing the number of Odid's that pass through each link. The processor may also analyze the number of Odid's that pass through the core link, as a reference. The processor may also select links through which Odid's pass, representing a high level (H %) with the core link as a reference. The processor may also select the well-used road in a manner that connects the links selected with the core link as the reference until the links are no longer connected to each other.

In an embodiment, according to another aspect of the present disclosure, a method of searching for an optimal route based on a well-used road includes selecting, by a processor, an extension link, which is to be extended according to priority, from among a plurality of search links starting from a departure link in order to search for an optimal route based on a route search engine. The method also includes determining, by the processor, an estimated-time-of-arrival (ETA) cost for the extension link for a search route through an ETA prediction model based on a well-used road to search an optimal route.

In an embodiment, in the method, the extension link may refer to a search link to be searched next time according to the priority stored in a priority queue (PQ).

In an embodiment, in the method, determining the ETA cost for the extension link for the search route may include determining, by the processor, the ETA cost by adding a cost from a current link to a destination to a cost from a departure to the current link.

In an embodiment, the method may further include, when the well-used road is matched to the extension link by utilizing the ETA prediction model, modifying and reflecting, by the processor, a cost for the well-used road by utilizing the ETA prediction model that is based on the well-used road.

In an embodiment, the method may further include, when the modified cost is reflected in the well-used road, inserting, by the processor, the extension link, which undergoes cost calculation, into a priority queue (PQ).

In an embodiment, the method may further include, in order to select the well-used road, analyzing, by the processor, a traffic distribution by utilizing probe data. The method may further include, in order to select the well-used road, selecting, by the processor, links representing a high traffic level (N %). The method may further include, in order to select the well-used road, selecting, by the processor, a core link that is a link representing a high level (K %) of passing-through by Odid's, from among the links representing the high traffic level (N %). The method may further include, in order to select the well-used road, selecting, by the processor, the well-used road passing through the selected core link.

In an embodiment, the method may further include, in order to select the well-used road passing through the selected core link, extracting, by the processor, all origin-destinations (OD's) passing through the core link. The method may further include, in order to select the well-used road passing through the selected core link, extracting, by the processor, a link through which even one of all OD's pass. The method may further include, in order to select the well-used road passing through the selected core link, generating, by the processor, a table showing the number of Odid's that pass through each link. The method may further include, in order to select the well-used road passing through the selected core link, analyzing, by the processor, the number of Odid's that pass through the core link, as a reference. The method may further include, in order to select the well-used road passing through the selected core link, selecting, by the processor, links through which Odid's pass, representing a high level (H %) with the core link as a reference. The method may further include, in order to select the well-used road passing through the selected core link, selecting, by the processor, the well-used road in a manner that connects the links selected with the core link as the reference until the links are no longer connected to each other.

According to the present disclosure, a more precise optimal route can be computed by increasing the precision in working out a cost for a route based on the well-used road.

According to the present disclosure, a core link can be selected based on a traffic amount and the number of Odid's that pass through each link, and then the well-used road passing through the core link can be generated.

The drawings described herein are for illustration purposes only and are not intended to limit the scope of the present disclosure in any way.

DETAILED DESCRIPTION

An apparatus and a method for searching for an optimal route based on a well-used road according to first and second embodiments of the present disclosure are described below with reference to the accompanying drawings.

For clarity and convenience in description, thicknesses of lines, sizes of constituent elements, and the like may be illustrated in a non-exact proportion in the drawings. In addition, terms used hereinafter to refer to constituent elements, respectively, according to the present disclosure are defined by considering their respective functions and may be adjusted according to a user's or an operator's intention or according to established practices in the art. Therefore, these terms should be contextually defined in light of the present disclosure.

When a component, device, element, or the like of the present disclosure is described as having a purpose or performing an operation, function, or the like, the component, device, or element should be considered herein as being "configured to" meet that purpose or to perform that operation or function.

The term "unit" or "module" used in the present disclosure signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

Figure 1:
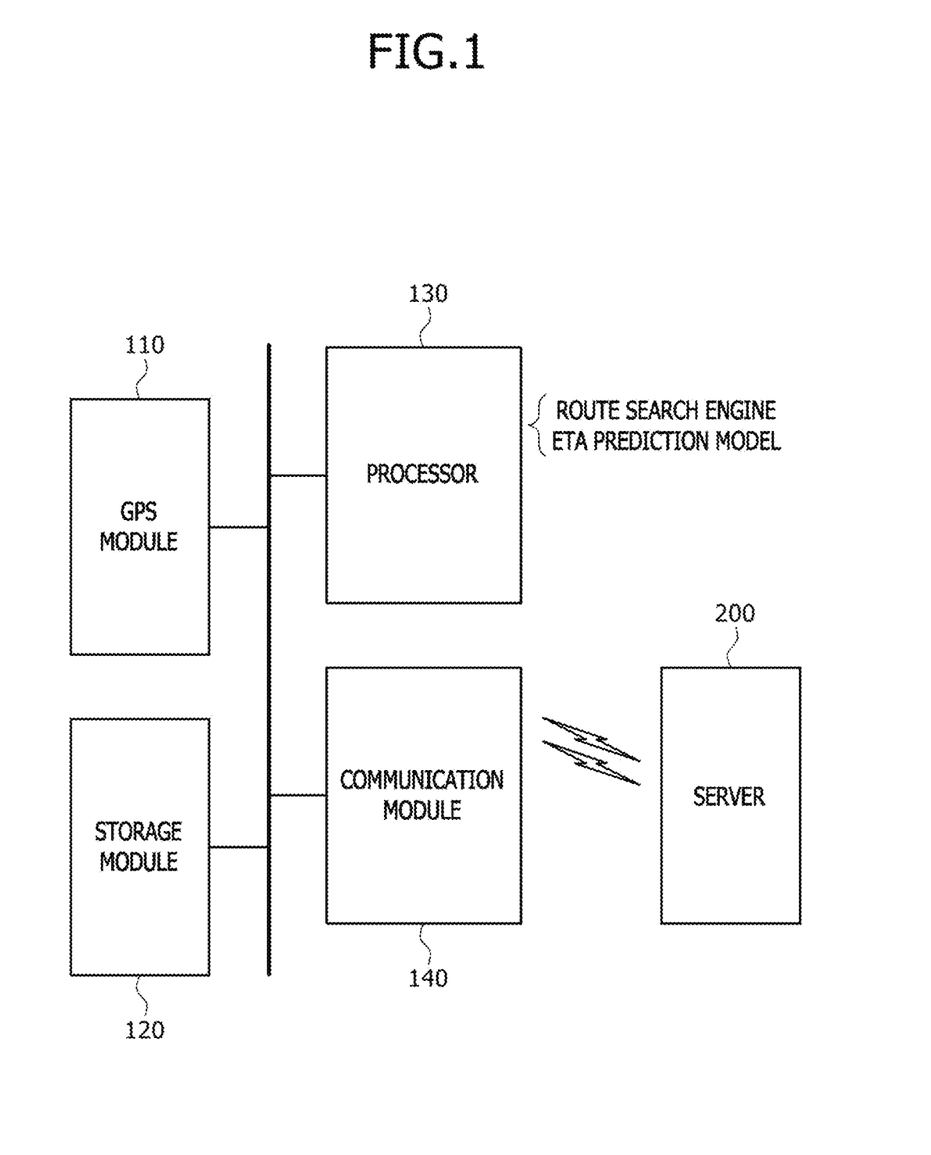
FIG. 1 is a diagram illustrating a schematic configuration of an apparatus for searching for an optimal route based on a well-used road according to a first embodiment of the present disclosure.

FIG. 1 is a diagram illustrating a schematic configuration of the apparatus for searching for an optimal route based on a well-used road according to the first embodiment of the present disclosure.

As illustrated in FIG. 1, the apparatus for searching for an optimal route based on a well-used road according to the first embodiment of the present disclosure includes a Global Positioning System (GPS) module 110, a storage module 120, a processor 130, and a communication module 140.

The GPS module 110 receives a GPS signal for measuring a current vehicular position. Moreover, the GPS module 110 receives current positional information of a navigation device.

A GPS module 110 may receive traffic (traffic amount) information or vehicular passing-through amount information on a per-link basis, lane information, traffic situation information (for example, an accident, an event, a road construction, and the like) on a per-road basis, and the like through a real-time traffic information reception module or the communication module 140.

The storage module 120 may store digital map data (for example, low-scale map data, HD map, and the like) in an internal memory (or a database). The digital map data includes geographical coordinates indicating a latitude and a longitude in degrees, minutes, and seconds.

Stored information in the storage module 120 may also include link information based on the digital map data and a record of traffic information on a per-link basis that is received through the communication module 140.

Stored information in the storage module 120 may also include a record of real-time traffic information on a per-link basis in terms of season, day, and time.

In this embodiment, the storage module 120 may operate in conjunction with a server 200. Thus, the stored information in the server 200 may include the record of the real-time traffic information on a per-link basis or the record of the real-time traffic information for a predetermined period of time (for example, a designated predetermined period of time) (for example, for one year).

Therefore, information stored in the storage module 120, referred to hereinafter, should be conceptually understood to include information stored in the server 200.

The processor 130 may reflect the information stored in the storage module 120 and road attributes (for example, the real-time traffic information on a per-link basis and road attributes (for example, the number of lanes, the presence or absence of a traffic light, the number of revolutions, an information-collection tracking path, the record of the traffic information, and the like)). The processor 130 may also perform training (for example, deep learning training).

The processor 130 may execute a route search engine (for example, a route search algorithm) and an ETA prediction model (for example, a deep learning model for ETA prediction).

The processor 130 may select (compute) a well-used road (or popular road) through a deep learning model.

The processor 130 may work out (compute or determine) a time cost for passing through a link associated with the well-used road (or popular road) and may reflect a cost for the worked-out well-used road (or popular road). Thus, the processor 130 may insert an extension link into a priority queue (PQ).

The processor 130 may compute a more precise optimal route by increasing the precision in working out a route cost based on the well-used road.

The communication module 140 may communicate with the server 200 (for example, an ETA prediction server, a cloud server, a navigation server, or the like).

The apparatus for searching for an optimal route based in a well-used road according to the first embodiment includes a navigation terminal installed in a vehicle and at least one external server 200 (for example, a navigation server, a cloud server, an ETA prediction server, and the like) that establishes a connection for communication with the navigation terminal.

For example, when communicatively connected with the server 200, the apparatus for searching for an optimal route based in a well-used road according to the first embodiment may use at least one piece of information (for example, real-time traffic information, ETA prediction information, cost information, or the like) provided to the server 200 or at least one piece of information (for example, real-time traffic information, ETA prediction information, cost information, or the like) provided from the server 200. By using this information, the apparatus may select (compute) a well-used road (or popular road), may work out a time cost for passing through a link associated with the well-used road (or popular road), may reflect a cost for the worked-out well-used road (or popular road), and thus may insert an extension link into a priority queue (PQ).

In addition, in the apparatus according to the first embodiment, the server 200 may be configured to receive a router search request from the vehicle through the navigation terminal installed in the vehicle, to compute an optimal route reflecting the cost for the well-used road, and then to provide the calculated optimal route to the navigation terminal.

In addition, a computing device, such as a processor, is also provided to the server 200, and thus the server 200 may perform this route search operation. For this reason, the server 200 can also be described as operating under the control of the processor.

Figure 2:
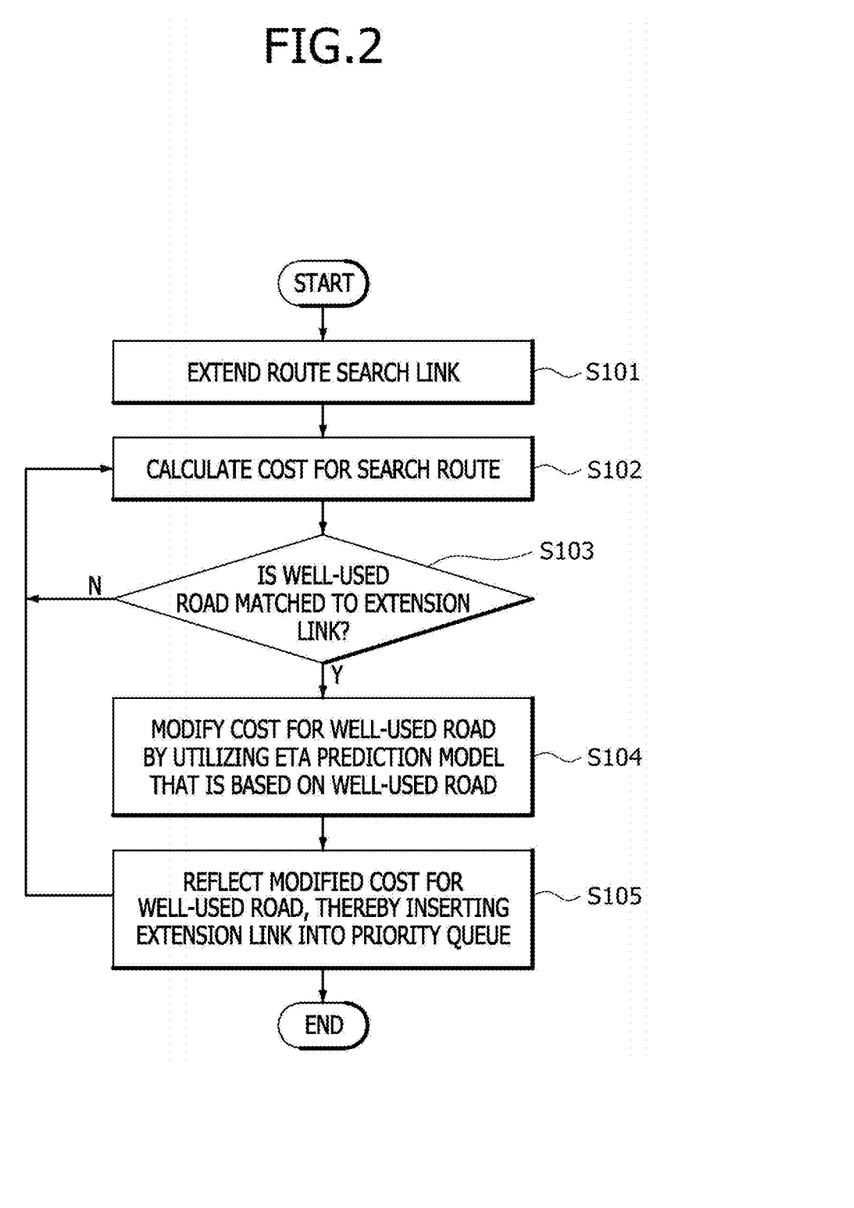
FIG. 2 is a flowchart that is referenced to describe a method of searching for an optimal route based on a well-used road according to a second embodiment of the present disclosure.

A method in which the processor 130 (or the server 200) computes the optimal route, reflecting the cost for the well-used road (or popular road), through the route search engine and the ETA prediction model is described with respect to a flowchart in FIG. 2.

FIG. 2 is a flowchart illustrating the method of searching for an optimal route based on a well-used road according to the second embodiment of the present disclosure.

With reference to FIG. 2, the processor 130 (or the server 200) selects a link to be extended (i.e., an extension link) from among a plurality of search links starting from a departure link in order to search for (compute) the optimal route based on the route search engine (S101).

At this time, the priority of the search link is stored in the priority queue (PQ), and the extension link refers to the search link that is to be searched next time according to the priority of the search link that is stored in the priority queue (PQ).

The processor 130 (or the server 200) calculates (computes) a cost for a search route through the ETA prediction model (S102).

For example, the cost for the search route is calculated by adding a H cost (from a current link to a destination) to a G cost (from a departure to the current link).

When the well-used road (or popular road) is matched to the extension link by utilizing the ETA prediction model (14xample in S103) (i.e., when the extension link includes the well-used road), the processor 130 (or the server 200) modifies the well-used road (or popular road) by utilizing the ETA prediction model that is based on the well-used road (or popular road) (S104).

For example, the cost for the well-used road (or popular road) may be decreased or increased based on a situation.

The processor 130 (or the server 200) reflects the modified cost in the well-used road (or popular road) and thus inserts the extension link, which undergoes cost calculation, into the priority queue (PQ) (S105).

Consequently, the processor 130 (or the server 200) reflects the modified cost in the well-used road (or popular road), searches for the optimal route, and guides a user (for example, a navigation user) through the found (computed) optimal route.

Figure 3:
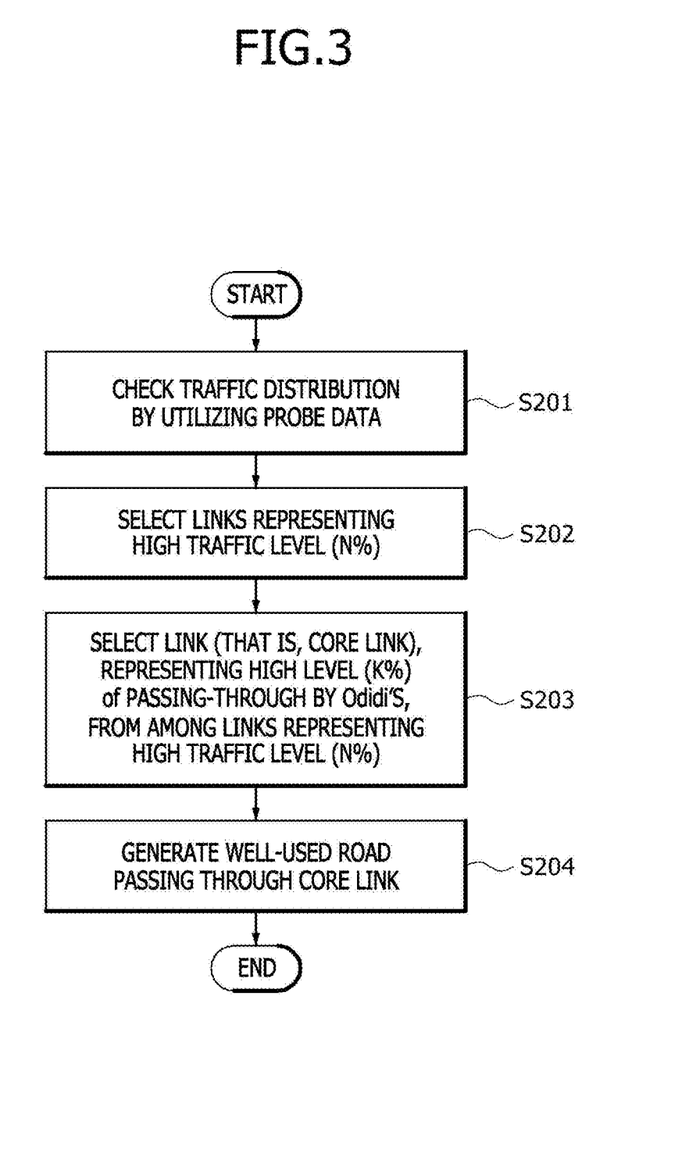
FIG. 3 is a flowchart that is referenced to describe the method of selecting the well-used road according to the second embodiment.

FIG. 3 is a flowchart that is referenced to describe the method of selecting the well-used road according to the second embodiment.

Figure 4A:
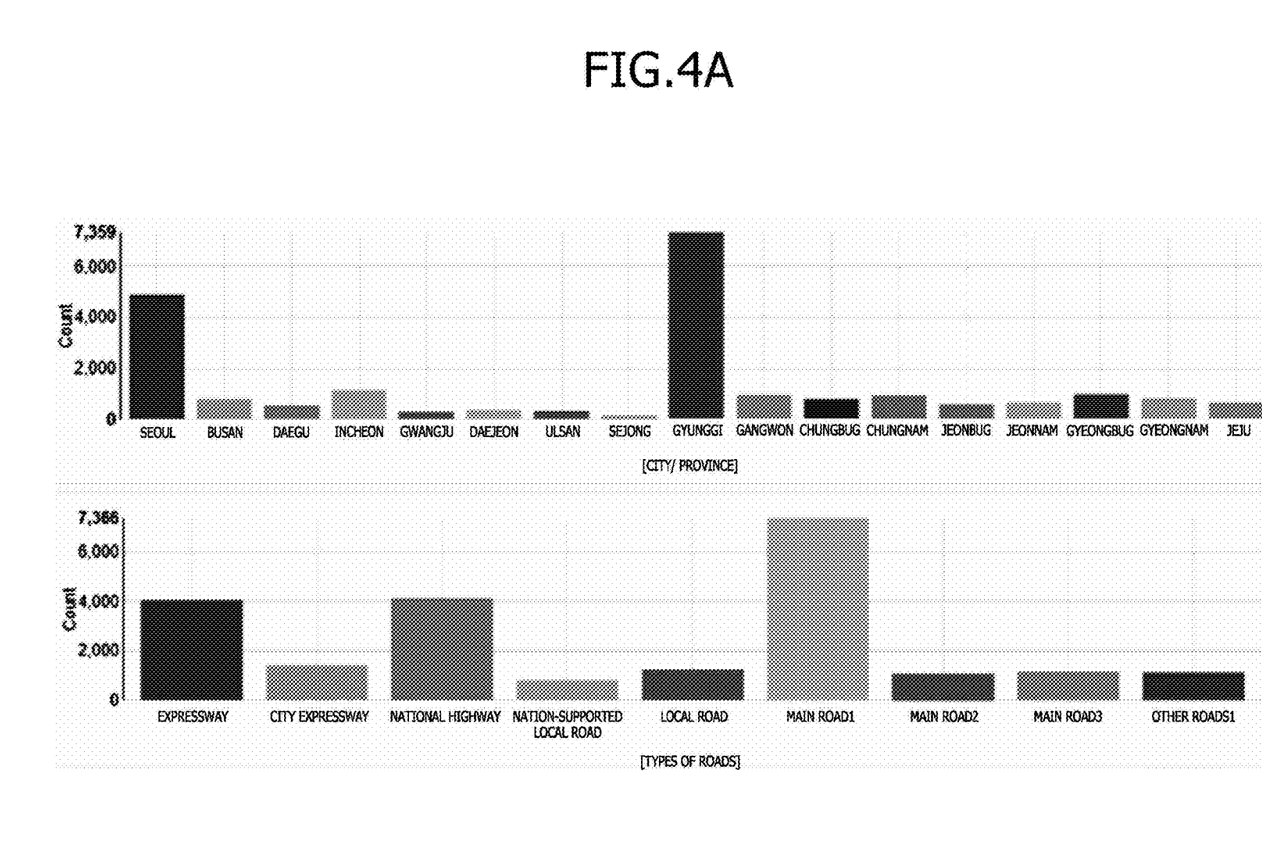
FIGS. 4A, 4B, and 4C are a graph, a table, and a map view, respectively, that are referenced to describe the method of selecting the well-used road in FIG. 3.
Figure 4B:
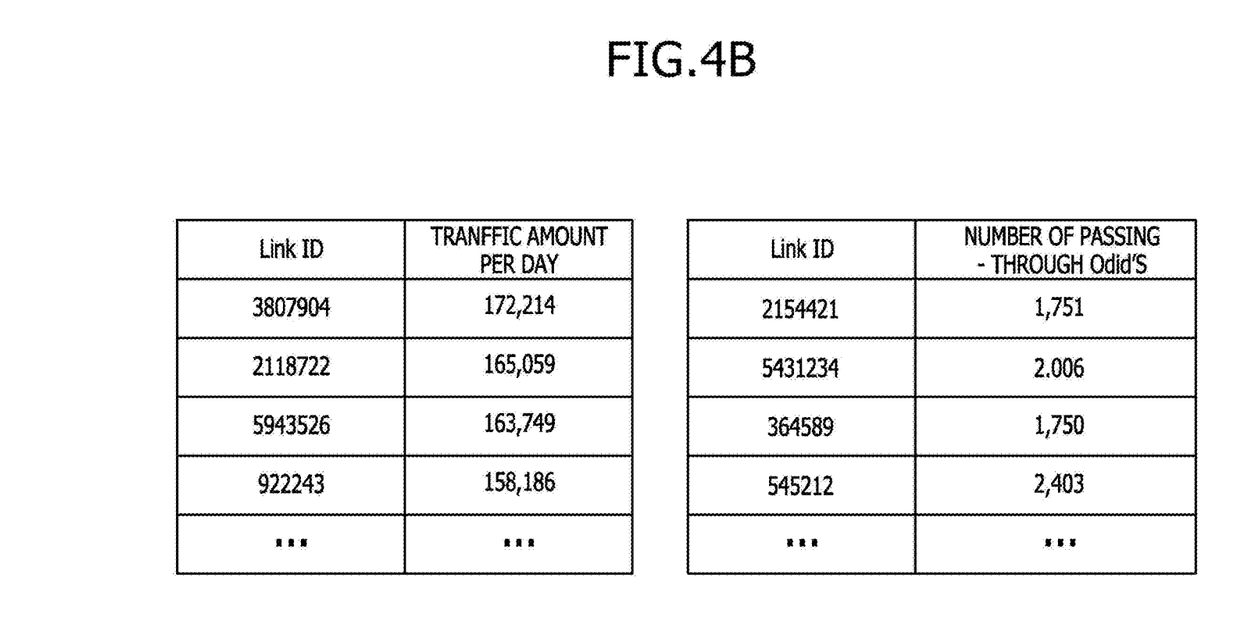
Figure 4C:
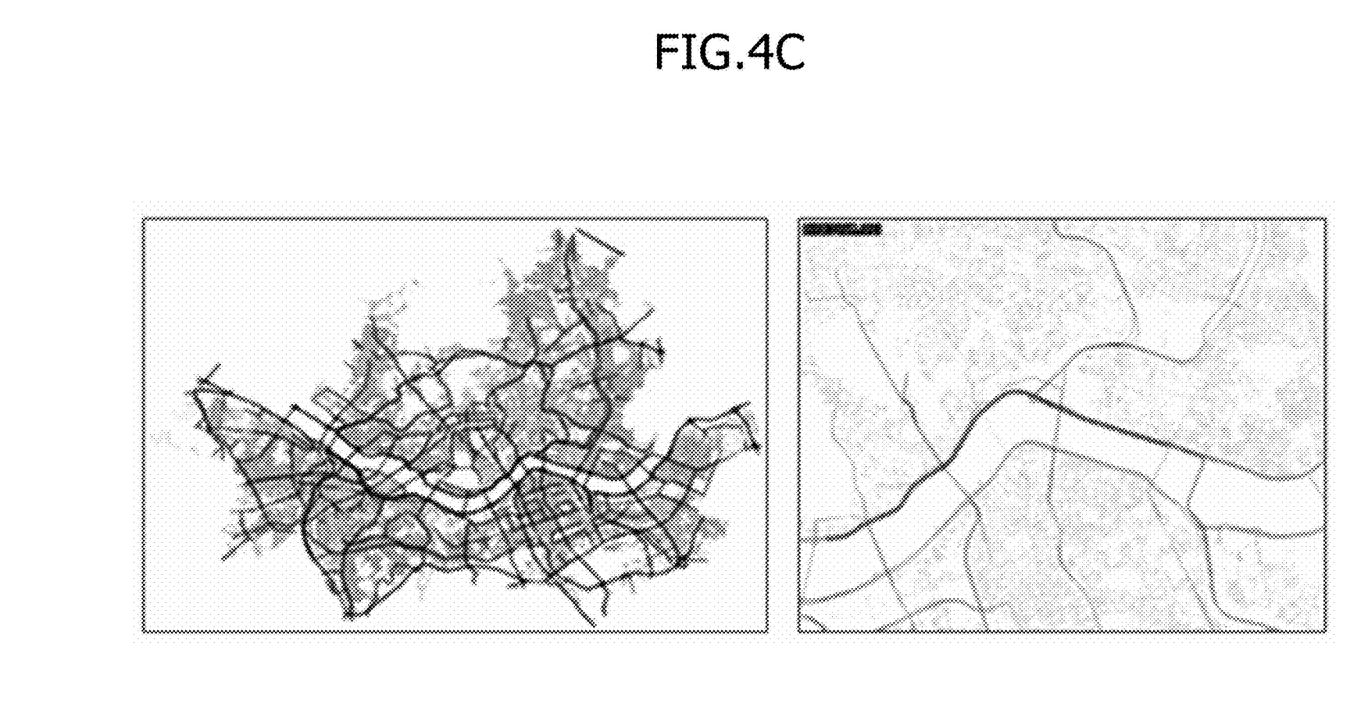

FIGS. 4A, 4B, and 4C are a graph, a table, and a map view, respectively, that are referenced to describe the method of selecting the well-used road in FIG. 3.

With reference to FIG. 3, in order to select the well-used road (or popular road), a traffic distribution is checked (analyzed) by utilizing probe data (S201).

At this point, a primary area and a type of road may be selected according to the traffic distribution.

For reference, FIG. 4A is a graph showing a traffic distribution that varies with a unit area and a type of road.

Links representing a high traffic level (N %) are selected (S202). Among these links, a link (i.e., a core link) representing a high level (K %) of Odid's (route identifiers, each of which is uniquely generated each time a request is made for a route) passing-through is selected (S203).

For reference, FIG. 4B is a table showing a daily traffic amount on a per-link basis and a table for showing the number of Odid's that pass through each link.

When the core link is selected as described above, the well-used road (or popular road) passing through the core link is generated (selected) (S204).

For example, all origin-destinations (OD's) (routes between the origin and the destinations) that pass through the core link is first extracted. A link through which even one of all OD's pass is extracted. A table showing the number of Odid's (route identifiers, each of which is uniquely generated each time a request is made for a route) that pass through each link is generated. Consequently, the number of Odid's that pass through the core link, as a reference, is analyzed. Next, links through which Odid's pass, representing a high level (H %) with the core link as a reference, are selected. Then, the links selected with the core link as the reference are connected (connected until they are no longer connected to each other)

For reference, FIG. 4C is a map view showing a road selected by the well-used road (or popular road) passing through the core link.

Figure 5:
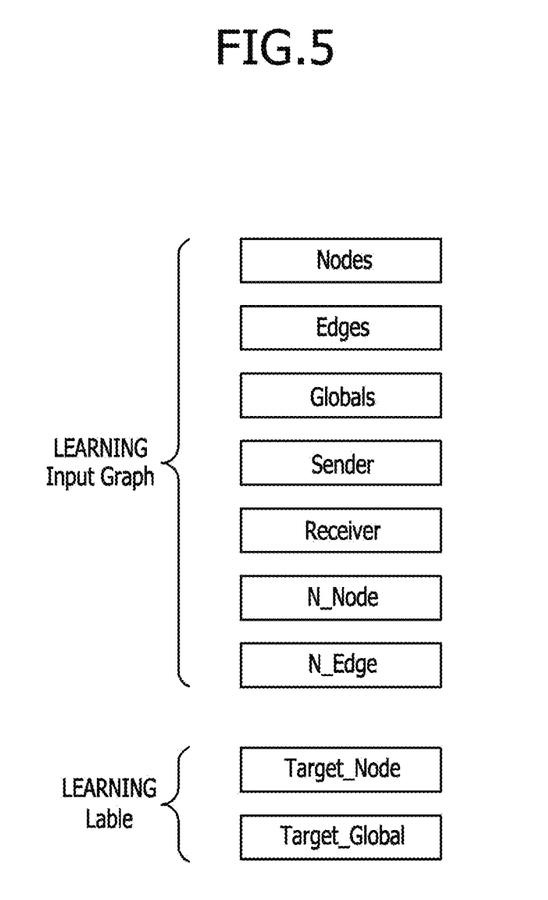
FIG. 5 is a block diagram illustrating input features and correct answers for training an ETA prediction model according to the present disclosure.

FIG. 5 is a block diagram illustrating input features and correct answers for training the ETA prediction model according to the present disclosure.

With reference to FIG. 5, the ETA prediction model (for example, the deep learning model for predicting ETA) is trained with data on the well-used road (for example, nodes-link attributes, accident information, a turn passing-through time on a per-link basis/a pattern passing-through time/a prediction passing-through time, edges-turn codes, whether or not to be connectable to an original well-used road, Globals-day of the week, a current time, ETA with a turn passing-through time as a reference, ETA with a pattern passing-through time as a reference, a sender—from link index, a receiver-to-link index, a list for the number of edges per N_Node-Graph, and a list for the number of nodes per N_Edge-Graph). Furthermore, the ETA prediction model outputs a time (Taget_Global) for passing through the well-used road and time (Target_Node) for passing through each link, as correct answers.

For reference, the data on the well-used road may be expressed by real roads in the form of a graph and may include links adjacent to the well-used road. The reason for this is to increase the precision in prediction of a main lane (i.e., the well-used road) by utilizing traffic information of an adjacent link.

According to the present disclosure, as described above, the core link may be selected based on a traffic amount and the number of Odid's that pass through each link. Then, the well-used road that passes through the core link may be generated. Consequently, the effect of computing a more precise optimal route can be achieved by increasing the precision in working out the cost for a route based on the well-used road.

The embodiments of the present disclosure are described only in an illustrative manner, with reference to the drawings. It should be understood by a person of ordinary skill in the art to which the present disclosure pertains that various other modifications and equivalents are possible from this description. Thus, the scope of the present disclosure should be defined by the following claims.

What is claimed is:

1. An apparatus for searching for an optimal route based on a well-used road, the apparatus comprising:
   a GPS module configured to detect a current vehicular position;
   a storage module configured to store digital map data; and
   a processor configured to:
      select an extension link, which is to be extended according to priority, from among a plurality of search links starting from a departure link, in order to search for an optimal route based on a route search engine on the basis of the current vehicular position and the digital map data;
      determine an estimated-time-of-arrival (ETA) cost for the extension link for a search route through an estimated-time-of-arrival (ETA) prediction model based on a well-used road to search for the optimal route; and
      transmit the optimal route to a vehicle-mounted navigation terminal and cause the vehicle-mounted navigation terminal to guide a user along the optimal route,
      wherein the well-used road is selected based on high traffic level links.

2. The apparatus of claim 1, wherein the extension link refers to a search link to be searched according to the priority stored in a priority queue (PQ).

3. The apparatus of claim 1, wherein, when determining an ETA cost for the extension link for the search route, the processor is further configured to determine the ETA cost by adding a cost from a current link to a destination to a cost from a departure to the current link.

4. The apparatus of claim 1, wherein, when the well-used road is matched to the extension link by utilizing the ETA prediction model, the processor is further configured to modify and reflect a cost for the well-used road by utilizing the ETA prediction model that is based on the well-used road.

5. The apparatus of claim 4, wherein the processor is further configured to reflect the modified cost in the well-used road and thus insert the extension link, which undergoes cost calculation, into a priority queue (PQ).

6. The apparatus of claim 1, wherein in order to select the well-used road, the processor is further configured to:
   analyze a traffic distribution by utilizing probe data;
   select links representing a high traffic level (N %);
   select a core link that is a link representing a high level (K %) of the number of route identifiers that are generated every request for a route, from among the links representing the high traffic level (N %); and
   select the well-used road passing through the selected core link.

7. The apparatus of claim 6, wherein in order to select the well-used road passing through the selected core link, the processor is further configured to:
   extract all origin-destinations (OD's) passing through the core link;

extract a link through which even one of all OD's pass;
generate a table showing the number of route identifiers that are generated every request for a route according to each link;
analyze the number of route identifiers that are generated every request for a route according to the core link, as a reference;
select links through which the number of route identifiers that are generated every request for a route, representing a high level (H %) with the core link as a reference; and
select the well-used road in a manner that connects the links selected with the core link as the reference until the links are no longer connected to each other.

8. A method of searching for an optimal route based on a well-used road, the method comprising:
selecting, by a processor, an extension link, which is to be extended according to priority, from among a plurality of search links starting from a departure link in order to search for an optimal route based on a route search engine;
determining, by the processor, an estimated-time-of-arrival (ETA) cost for the extension link for a search route through an ETA prediction model based on a well-used road to search an optimal route; and
transmitting, by the processor, the optimal route to a vehicle-mounted navigation terminal to guide a user along the optimal route,
wherein the well-used road is selected based on high traffic level links.

9. The method of claim 8, wherein the extension link refers to a search link to be searched according to the priority stored in a priority queue (PQ).

10. The method of claim 8, wherein, determining the ETA cost for the extension link for the search route comprises determining, by the processor, the ETA cost by adding a cost from a current link to a destination to a cost from a departure to the current link.

11. The method of claim 8, further comprises: when the well-used road is matched to the extension link by utilizing the ETA prediction model, modifying and reflecting, by the processor, a cost for the well-used road by utilizing the ETA prediction model that is based on the well-used road.

12. The method of claim 11, further comprising, when the modified cost is reflected in the well-used road, inserting, by the processor, the extension link, which undergoes cost calculation, into a priority queue (PQ).

13. The method of claim 8, further comprising, in order to select the well-used road:
analyzing, by the processor, a traffic distribution by utilizing probe data;
selecting, by the processor, links representing a high traffic level (N %);
selecting, by the processor, a core link that is a link representing a high level (K %) of the number of route identifiers that are generated every request for a route, from among the links representing the high traffic level (N %); and
selecting, by the processor, the well-used road passing through the selected core link.

14. The method of claim 13, further comprising, in order to select the well-used road passing through the selected core link:
extracting, by the processor, all origin-destinations (OD's) passing through the core link;
extracting, by the processor, a link through which even one of all OD's pass;
generating, by the processor, a table showing the number of route identifiers that are generated every request for a route according to each link;
analyzing, by the processor, the number of route identifiers that are generated every request for a route according to the core link, as a reference;
selecting, by the processor, links through which the number of route identifiers that are generated every request for a route, representing a high level (H %) with the core link as a reference; and
selecting, by the processor, the well-used road in a manner that connects the links selected with the core link as the reference until the links are no longer connected to each other.

* * * * *